Figures 1, 2:
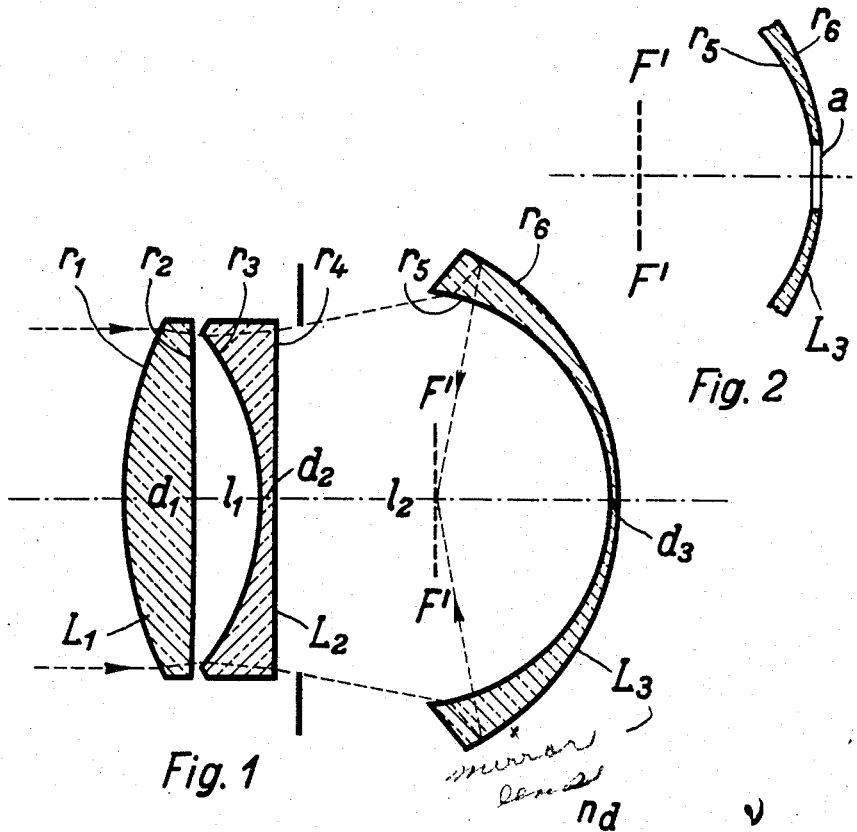

Dec. 27, 1938.  A. SONNEFELD  2,141,884
PHOTOGRAPHIC OBJECTIVE
Filed Nov. 5, 1937

| | | | $n_d$ | $v$ |
|---|---|---|---|---|
| $r_1 = + 230$ | $d_1 = 44$ | $L_1 = 1.505$ | | 64.8 |
| $r_2 = -3400$ | $l_1 = 40$ | | | |
| $r_3 = - 156$ | $d_2 = 10$ | $L_2 = 1.620$ | | 36.3 |
| $r_4 = +5200$ | $l_2 = 200$ | | | |
| $r_5 = - 121$ | $d_3 = 5$ | $L_3 = 1.505$ | | 64.3 |
| $r_6 = - 162$ | | | | |

Inventor:
August Sonnefeld

Patented Dec. 27, 1938

2,141,884

UNITED STATES PATENT OFFICE 2,141,884

PHOTOGRAPHIC OBJECTIVE

August Sonnefeld, Jena, Germany, assignor to the firm Carl Zeiss, Jena, Germany

Application November 5, 1937, Serial No. 172,993
In Germany November 12, 1936

1 Claim. (Cl. 88—57)

This application has been filed in Germany, November 12, 1936.

The present invention concerns objectives having an imaging member which is a mirror lens, viz. a member influencing the path of the imaging rays not only by refraction but also by reflection. Objectives of this kind have been suggested repeatedly. These known objectives, however, permit only the imaging of a small field of view, similar to that of the usual telescope objectives, and they have, moreover, a ratio of aperture which is very small and in most cases far below 1:5, the use of these objectives being therefore restricted very much. Some of the suggested systems have ratios of aperture up to 1:2, but their field correction is quite inadequate.

According to the invention, objectives of the said kind produce far better results than hitherto when they consist of three members, viz. two exterior convergent members and an interior divergent member, the last of these three members being the mirror lens. It is convenient to provide that the front vertex of the mirror lens and the rear vertex of the medial member have a distance apart greater than the focal length of the objective, and that the length of the radius of curvature of the reflecting surface of the mirror lens surpasses by one quarter that of the radius of curvature of the refracting surface of this lens.

There is obtained in this manner not only a good correction of the chromatic and spherical errors but also ratios of apertures of far more than 1:1 in a field of view of approximately 10° and more, so that the objectives according to the invention can be used to advantage for different purposes in photography and spectrography. In the reverse path of the rays, the objectives can be used for microscopy, especially for the microscopy of metals.

The above sequel of the lenses is that concerned in imaging on a reduced scale, as is generally the case in photography.

Very often it will be sufficient to use an objective in which the above-said members are single lenses, but, nevertheless, it may be convenient to provide that the one or the other member or all members consist of a plurality of lenses or a plurality of cemented lenses. The objectives according to the invention also permit the use of members of one and the same material, for instance of one kind of glass.

Figure 1 of the accompanying drawing and the following table show by way of example a photographic objective according to the invention, and Figure 2 illustrates a variation of this objective, both the said figures being axial sections through the objective.

The objective shown by Figure 1 consists of a convergent lens $L_1$, which is to face the object in imaging on a reduced scale, a divergent lens $L_2$, and a convergent mirror lens $L_3$ the concave side of which faces the lens $L_2$. The objective has a ratio of aperture of 2:1 and can be used for an angle of approximately 15° of the field of view. The dimensions stated in the table, which are in millimetres, refer to a focal length of the objective of 100 millimetres. The radii of the optically effective surfaces of the objectives are designated $r_1$, $r_2$ ... $r_6$. The surface having the radius $r_6$ is the reflecting surface.

| Radii | Thicknesses and distances | Kinds of glass | |
|---|---|---|---|
| | | $n_d$ | $\gamma$ |
| $r_1 = +230$ | $d_1 = 44$ | 1.505 | 64.8 |
| $r_2 = -3400$ | $l_1 = 40$ | | |
| $r_3 = -156$ | $d_2 = 10$ | 1.620 | 36.3 |
| $r_4 = +5200$ | $l_2 = 200$ | | |
| $r_5 = -121$ | $d_3 = 5$ | 1.505 | 64.8 |
| $r_6 = -162$ | | | |

The focal plane of the objective is designated $F'$—$F'$ in the drawing and lies at a distance of 104 millimetres in front of the front vertex of the mirror lens.

When the objective shown by Figure 1 of the drawing is to be used in microscopy with incident light, the mirror lens $L_3$ is suitably provided with a central aperture $a$, as illustrated in Figure 2, through which the object to be magnified can be illuminated from the rear of the mirror lens $L_3$, the said object lying in microscoping between the medial lens $L_2$ and the mirror lens $L_3$.

I claim:

A photographic objective comprising, in combination and axially spaced from each other, a front convergent lens, a divergent lens, and a convergent mirror lens, said divergent lens lying between said front lens and said mirror lens, the concave side of said mirror lens facing said divergent lens, said front lens and said divergent lens having an axial distance apart greater than one tenth of and smaller than half the focal length of the objective, said divergent lens and said mirror lens having an axial distance apart greater than and at most three times the focal length of the objective, the radius of curvature of the reflecting surface of said mirror lens being at least one-and-a-fourth times and at most one-and-a-half times the radius of curvature of the refractive surface of said mirror lens, and the radius of curvature of the refractive surface of said mirror lens being at least three quarters of and at most one-and-a-third times the focal length of the objective.

AUGUST SONNEFELD.